(No Model.)

W. C. DEMAIN.
MACHINE FOR CUTTING AND FORMING RULING PENS.

No. 274,732. Patented Mar. 27, 1883.

Witnesses:
Walter E. Lombard.
E. A. Hemmenway.

Inventor:
Wm. Cornforth Demain,
by N. C. Lombard
Attorney.

UNITED STATES PATENT OFFICE.

WILLIAM C. DEMAIN, OF CAMBRIDGEPORT, MASSACHUSETTS.

MACHINE FOR CUTTING AND FORMING RULING-PENS.

SPECIFICATION forming part of Letters Patent No. 274,732, dated March 27, 1883.

Application filed October 23, 1882. (No model.)

*To all whom it may concern:*

Be it known that I, WILLIAM CORNFORTH DEMAIN, of Cambridgeport, in the county of Middlesex and State of Massachusetts, have invented a new and useful Machine for Cutting and Forming Ruling-Pens, of which the following, taken in connection with the accompanying drawings, is a specification.

My invention relates to a machine for cutting and shaping from sheet-metal pens for use upon paper-ruling machines; and it consists in certain details of construction and arrangements of parts, which will be best understood by reference to the description of the drawings and to the claims to be hereinafter given.

Figure 1:
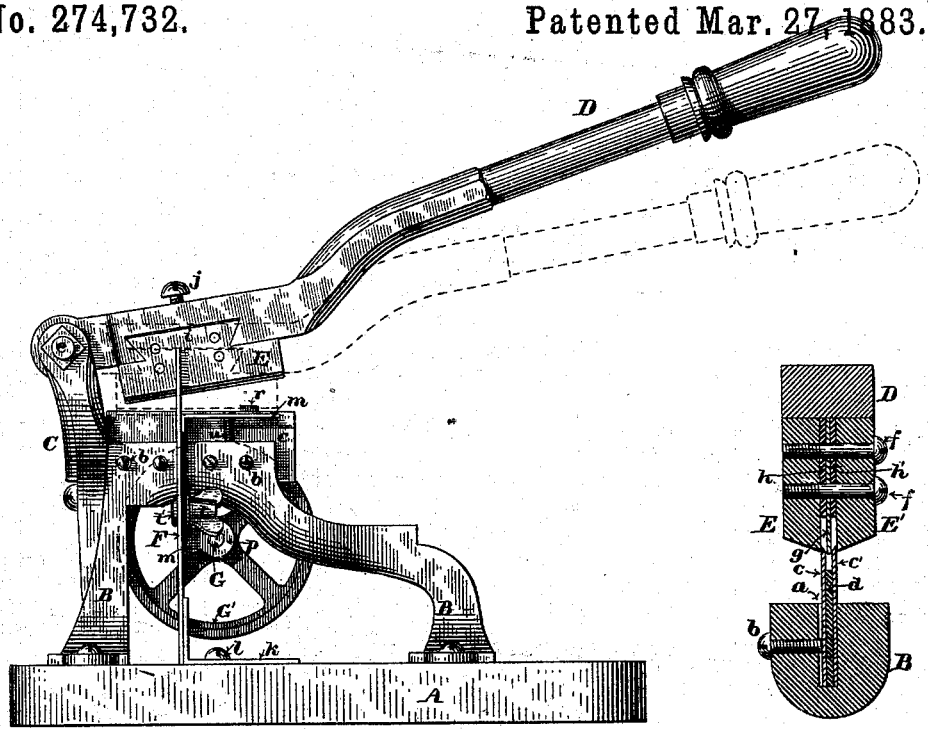
Figure 2:
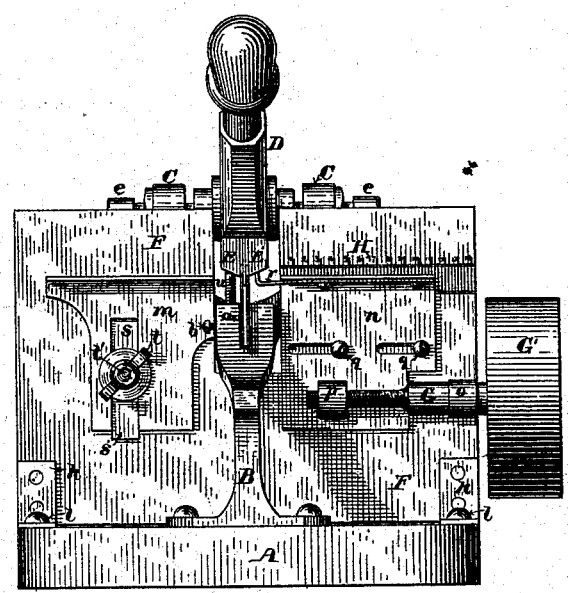

Figure 1 of the drawings is a side elevation of a machine embodying my invention. Fig. 2 is a front end elevation, and Fig. 3 is a transverse section through the cutting and shaping tools when in the position they occupy when the cutting and shaping has been completed.

Figure 3:
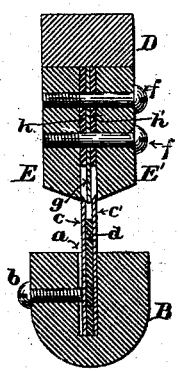

A is the bed of the machine, from which rises the frame B, provided in its upper side with a groove, $a$, in which is secured by set-screws $b$ $b$ the two cutting-blades $c$ and $c'$, said blades being kept at the desired distance apart by the filling-plate $d$, made somewhat narrower than said blades, as shown in Fig. 3.

C is a forked stand secured to the rear end of the frame B, and provided at its upper end with the screw-centers $e$ $e$, upon which is mounted the hand-lever D in such a manner that it may be vibrated about said centers at will.

E and E' are two cutters, arranged parallel to each other and at a distance apart just equal to the distance from the outer or cutting corner of the fixed cutter-blade $c$ to the outer or cutting corner of the blade $c'$, said cutters E and E' being secured together by means of the screws $f$ $f$, and kept at the proper distance apart by the crimping-plate $g$ and the filling-plates $h$ and $h'$, interposed between them, as shown in Fig. 3. The cutters E and E' are each provided with a dovetail-shaped shank, $i$, which fits into a correspondingly-shaped slot cut transversely across the under side of the lever D, near its pivoted end, by means of which and the set-screw $j$ said cutters are adjustably secured to the lever D. The crimping-plate $g$ is located centrally between the cutters E and E', and is so set that the downward movement of the lever D will cause said plate to press upon the narrow piece of metal which rests upon the upper edges of the fixed cutter-blades $c$ and $c'$ and force it downward between said plates $c$ and $c'$, and thus bend said strip partially around the edge of the plate $g$, so that its cross-section shall be in the form of a letter V.

F is an upright plate, adjustably secured to the bed A by means of the slotted knees $k$ $k$ and screws $l$ $l$, and has secured upon its front side the adjustable tables $m$ and $n$ and the bearing $o$, in which is mounted the shaft G, provided at one end with the hand-wheel G' and at the other end with a male screw-thread, which works in the nut $p$, secured to the table $n$, whereby said table may be adjusted horizontally toward or from the fixed cutters, said table being supported by said screw-shaft and the screws $q$ $q$.

To the under side of the horizontal portion of the table $n$ is secured the spring-finger $r$, which projects beyond the inner end of the table $n$, and has a portion of its end turned upward at right angles to its main body, as shown, to serve as a gage to determine the distance apart of the successive pens to be formed upon a strip of metal.

The upright portion of the table $m$ has formed therein a vertical slot, $s$, which fits the guide $s'$, so that said table may be adjusted vertically and secured in the desired position by means of the thumb-nut $t$ and bolt $t'$.

The downward movement of the lever D and cutters E and E' is limited by the stop-screw $u$, set in the frame B, as shown in Figs. 1 and 2.

The operation of my invention is as follows: The plate F being adjusted to the proper distance from the front ends of the cutter-blades $c$ and $c'$, a strip of thin sheet-brass of the desired width is placed upon the table $m$, with one edge in contact with the plate F, when the operator raises the lever D with his right hand, moves the strip of brass toward the right with his left hand till its end rests upon the upper edges of the cutters $c$ $c'$. He then moves the lever D downward till the cutter E strikes the stop-screw $u$, making two incisions in the strip of brass and shaping a pen. He then raises the lever D, moves the strip again toward the right, and places the upright portion of the gage $r$ in the slit nearest the end of the brass strip, and moves the lever D downward again, cutting and shaping a second pen at the required distance from the first one cut and shaped. This operation is repeated till a series of pens of the required number and the proper distance apart are cut and shaped, the whole series being connected together by a portion of the brass strip along one edge that is uncut.

The gage $r$ may be readily and accurately adjusted to the proper position by means of the hand-wheel G', its screw-shaft G, and the scale H, graduated upon the plate F just above the table $n$, the left-hand edge of the upright portion of said table serving as the index to determine its proper location.

The pieces of metal between the several pens are severed from the strip or comb at the termination of the incisions by an after operation.

What I claim as new, and desire to secure by Letters Patent of the United States, is—

1. The combination of the fixed cutters $c$ and $c'$, the two movable cutters E and E', and the crimping-blade $g$, all constructed, arranged, and adapted to operate substantially as and for the purposes described.

2. The combination of the fixed cutters $c$ and $c'$, the movable cutters E and E', the crimping-blade $g$, and an adjustable gage for determining the distance apart of the successive cuts, substantially as described.

3. The combination of the fixed cutters $c$ and $c'$, the movable cutters E and E', the crimping-blade $g$, the adjustable table $n$, the gage $r$, and the scale H, all arranged and adapted to operate substantially as and for the purposes described.

4. The combination of the fixed cutters $c$ and $c'$, the movable cutters E and E', and the crimping-blade $g$, mounted upon the hand-lever D, the adjustable plate F, the adjustable tables $m$ and $n$, and the graduated scale H, all arranged and adapted to operate substantially as and for the purposes described.

In testimony whereof I have signed my name to this specification, in the presence of two subscribing witnesses, on this 20th day of October, A. D. 1882.

WM. CORNFORTH DEMAIN.

Witnesses:
E. A. HEMMENWAY,
WALTER E. LOMBARD.